(12) United States Patent
Suita

(10) Patent No.: US 11,142,023 B2
(45) Date of Patent: Oct. 12, 2021

(54) PNEUMATIC TIRE

(71) Applicant: TOYO TIRE & RUBBER CO., LTD., Itami (JP)

(72) Inventor: Harunobu Suita, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 257 days.

(21) Appl. No.: 16/163,145

(22) Filed: Oct. 17, 2018

(65) Prior Publication Data
US 2019/0135040 A1 May 9, 2019

(30) Foreign Application Priority Data

Nov. 9, 2017 (JP) .............................. JP2017-216088

(51) Int. Cl.
| | |
|---|---|
| *B60C 9/18* | (2006.01) |
| *B60C 9/20* | (2006.01) |
| *B60C 9/22* | (2006.01) |
| *B60C 11/00* | (2006.01) |
| *B60C 9/00* | (2006.01) |
| B60C 11/04 | (2006.01) |
| B60C 11/03 | (2006.01) |

(52) U.S. Cl.
CPC .......... *B60C 9/2006* (2013.01); *B60C 9/0007* (2013.01); *B60C 9/22* (2013.01); *B60C 11/0083* (2013.01); B60C 11/04 (2013.01); B60C 2009/2016 (2013.01); B60C 2009/2025 (2013.01); B60C 2009/2074 (2013.01); B60C 2011/0386 (2013.01); B60C 2011/0388 (2013.01); B60C 2200/06 (2013.01)

(58) Field of Classification Search
CPC .............. B60C 9/18; B60C 2009/2012; B60C 2009/2016; B60C 2009/2025; B60C 2009/2032
See application file for complete search history.

(56) References Cited

FOREIGN PATENT DOCUMENTS

| JP | 2006-205817 A | 8/2006 |
| JP | 2008006892 A * | 1/2008 |
| JP | 2011230538 A * | 11/2011 |

OTHER PUBLICATIONS

Office Action dated Feb. 20, 2021, issued in counterpart CN Application No. 201811206399.3, with English Translation. (17 pages).

* cited by examiner

*Primary Examiner* — Justin R Fischer
*Assistant Examiner* — Cedrick S Williams
(74) *Attorney, Agent, or Firm* — Westerman, Hattori, Daniels & Adrian, LLP

(57) ABSTRACT

A tire having four belt plies laminated at an outside circumference of the carcass. Cords at second and third belt plies among the four belt plies, as numbered from the carcass to the outside circumference, intersect, being inclined in mutually opposite fashion with respect to a tire axis. Angles of inclination with respect to the tire circumferential direction of the second and third belt plies are such that an angle at a belt end is less than an angle at a tire equator. A first mounded region that has a peak at which the angle of inclination is greater than at a periphery and that corresponds to a shoulder rib which among the plurality of ribs is provided. The peak at the first mounded region is arranged at a shoulder rib region which appears to overlap the shoulder rib as seen in plan view.

8 Claims, 6 Drawing Sheets

PNEUMATIC TIRE

BACKGROUND OF THE INVENTION

Field of the Invention

The present disclosure relates to a pneumatic tire intended for heavy loads in which a rib extending in the tire circumferential direction is formed at the tread.

Description of the Related Art

A pneumatic tire intended for heavy loads which may be employed in trucks, buses, and so forth is a radial tire that has a carcass having steel cord(s) arranged so as to emanate in radial fashion from a central location at the axis of the tire. Four belt plies having steel cords are laminated at the outside circumference of the carcass. Major grooves which extend in the tire circumferential direction are formed at the tread, and ribs which are partitioned by major grooves extend in the tire circumferential direction. A pneumatic tire intended for heavy loads and referred to as a rib tire is a tire in which only ribs are formed at the tread.

A tire intended for heavy loads is disclosed at Japanese Patent Application Publication Kokai No. 2006-205817, where there is a description to the effect that, at only a single belt ply, angles in major groove regions should be made to vary more than angles elsewhere to suppress occurrence of groove cracking. There is a description to the effect that angles within major groove regions should be 30° to 45° with respect to the tire circumferential direction.

However, as a major groove angle of 30° to 45° is impractical, being too large, the inventor(s) were unable to achieve the desired benefit despite their best efforts.

While resistance to uneven wear and suppression of radial increase in dimensions at shoulder regions during driving are desired in tires intended for heavy loads, the foregoing publication makes no mention of these issues.

SUMMARY OF INVENTION

The present disclosure was conceived in view of such issues, it being an object thereof to provide a pneumatic tire possessing improved resistance to uneven wear and suppression of radial increase in dimensions at shoulder regions during driving.

To solve the foregoing problem, the present disclosure employs means as described below.

In other words, according to the present disclosure, there is provided a pneumatic tire having: a carcass, and having four belt plies laminated at an outside circumference of the carcass in a tread region, wherein formed at a surface of the tread region are a plurality of major grooves which extend in a tire circumferential direction, and a plurality of ribs which extend in continuous fashion in the tire circumferential direction and which are partitioned by the major grooves;

wherein cords at second and third belt plies among the four belt plies, as numbered from the carcass to the outside circumference, intersect, being inclined in mutually opposite fashion with respect to a tire axis;

wherein angles of inclination with respect to the tire circumferential direction of the second and third belt plies are such that an angle at a belt end is less than an angle at a tire equator;

wherein a first mounded region in which angle varies that has a peak at which the angle of inclination is greater than at a periphery and that corresponds to a shoulder rib which among the plurality of ribs is outwardmost in a tire width direction is provided; and wherein the peak at the first mounded region in which angle varies is arranged at a shoulder rib region which appears to overlap the shoulder rib as seen in plan view.

As a result of adoption of such a constitution, it will be possible to improve resistance to uneven wear and to suppress increase in radial dimensions at shoulder regions during driving.

DETAILED DESCRIPTION OF THE PREFERRED EMBODIMENTS

Below, a pneumatic tire in an embodiment in accordance with the present disclosure is described with reference to the drawings.

Figure 1:
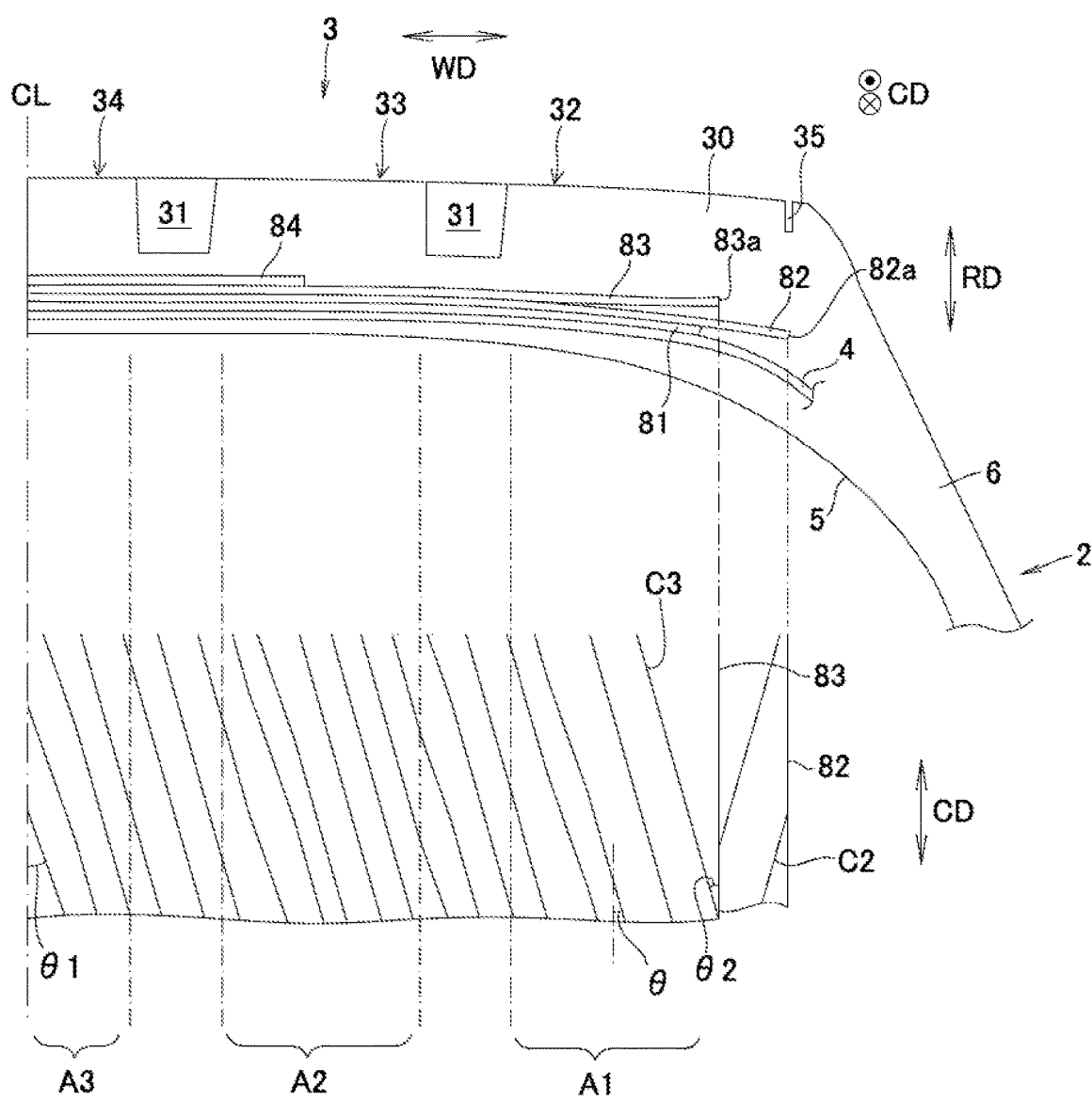
FIG. 1 Drawing showing relationship between cord angle at belt and profile at tread in an embodiment in accordance with the present disclosure.

As shown in FIG. 1, pneumatic tire is provided with a pair of bead regions (not shown); sidewall regions 2 which extend outwardly in the tire radial direction RD from the respective bead regions; and tread region 3 which is contiguous with the outer ends in the tire radial direction RD of the two sidewall regions 2. Present at the bead region are an annular bead core at which steel wire or other such convergent body is coated with rubber, and bead filler which comprises hard rubber.

Furthermore, this tire is provided with toroidal carcass 4 which extends from tread region 3 and passes through sidewall region 2 to reach the bead region. Carcass 4 is disposed between the pair of bead regions, and has end regions that are upturned into the bead cores. Carcass 4 has steel cord(s) which extend in radial fashion from a central location at the axis of the tire, and topping rubber which covers the steel cord(s). The steel cord(s) are parallel to tire meridional section(s) and are perpendicular or approximately perpendicular to the tire circumferential direction. Arranged at a location toward the interior from the carcass is inner liner rubber 5 for retention of air pressure.

Provided at a location toward the exterior from carcass 4 at sidewall region 2 is sidewall rubber 6. Furthermore, provided at a location toward the exterior from carcass 4 at the bead region is rim strip rubber (not shown) which comes in contact with the rim (not shown) when the tire is mounted on a rim.

Provided at the outside circumference of carcass 4 at tread region 3 are, in order from the interior to the exterior, four belt plies 81, 82, 83, 84 for reinforcing carcass 4, and tread rubber 30. Formed at the surface of tread region 3 are a plurality of major grooves 31 extending in the tire circumferential direction CD, and ribs 32, 33, 34 which are partitioned by major grooves 31 and which extend in continuous fashion in the tire circumferential direction CD. As the present embodiment is a rib tire, only ribs are formed thereon. Here, the term "rib" includes not only lug portions at which there are no grooves that would cause the lug portion to be divided in the tire circumferential direction, but also lug portions at which there are groove(s) which cause the lug portion to be divided in the tire circumferential direction, provided that those groove(s) are of narrower width than the width of the major grooves, and provided that those groove(s) are of shallower depth than the depth of the major grooves. Whereas, in the present embodiment, two major grooves 31 are formed at each side of the tire such that there are a total of four major grooves 31 overall, there is no limitation with respect thereto. For example, there may be a total of three thereof overall, or there may be a total of five or more thereof overall. Note, further, that whereas in the present embodiment narrow groove(s) 35, which are narrower in width than major grooves 31, are formed at end(s) in the width direction of shoulder rib(s) 32, which, of the plurality of ribs 32, 33, 34, are the outwardmost in the tire width direction, it is also possible for narrow groove(s) 35 to be omitted. In the present specification, shoulder rib 32 refers to a rib that is partitioned by major groove(s) 31 which are outwardmost in the tire width direction, and not to lug portion(s) that are partitioned by narrow groove(s) 35 (lug portion(s) that are located toward the exterior in the tire width direction from narrow groove(s) 35). While width of major groove(s) is not less than 5 mm but not greater than 15 mm, width of narrow groove(s) is not less than 1 mm but not greater than 3 mm.

The four belt plies 81, 82, 83, 84 comprise a plurality of steel cords which are respectively arrayed in parallel after the fashion of a Venetian blind, these being formed in such fashion as to be covered by rubber. Cords C2, C3 at belt plies 82, 83, which are the second and third among the four belt plies 81, 82, 83, 84 as these are numbered in order from carcass 4 to the outside circumference, intersect, being inclined in mutually opposite fashion with respect to the axis of the tire. Second and third belt plies 82, 83 are what so-called main belts which entrap tread rubber 30 therebetween.

Figure 2:
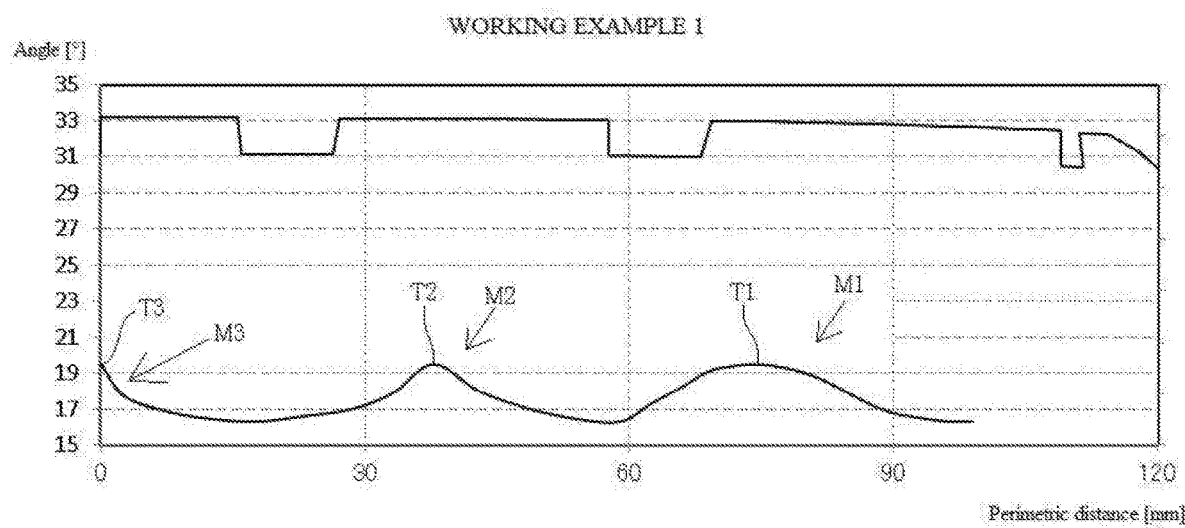
FIG. 2 Drawing showing relationship between cord angle at third belt and profile at tread in Working Example 1.

FIG. 2 is a drawing showing tread shape, and the angle at which the cord(s) of third belt ply 83 are inclined with respect to the tire circumferential direction CD as a function of perimetric distance. Perimetric distance refers to the distance from tire equator CL as measured along the bottom of third belt ply 83 within a tire meridional section. As shown in FIG. 1 and FIG. 2, the angles with which second and third belt plies 82, 83 are inclined with respect to the tire circumferential direction CD are such that angle $\theta 2$ at belt ends 82a, 83a is less than angle $\theta 1$ at the tire equator CL. To the extent that this relationship holds, the degree to which constraining by main belts 82, 83 occurs will be greater in the shoulder region than at the tire equator CL. In the example of FIG. 2, note that angle $\theta 1$ of inclination at tire equator CL is 19.5°, and angle $\theta 2$ of inclination at belt end 83a is 16.3°.

As shown in FIG. 1 and FIG. 2, a first mounded region M1 in which angle varies and that has a peak T1 at which angle $\theta$ of inclination is greater than at the periphery (i.e., at either side in the tire width direction) is provided. First mounded region M1 in which angle varies corresponds to shoulder rib 32 which is that one among the plurality of ribs 32, 33, 34 that is outwardmost in the tire width direction WD. Peak T1 of first mounded region M1 in which angle varies is arranged at shoulder rib region A1 which appears to overlap shoulder rib 32 as seen in plan view. This being the case, portion(s) at which the angle of inclination is relatively large as compared with that toward the tire equator CL will exist at shoulder rib(s), making it possible to tolerate increase in dimensions in the radial direction at shoulder rib(s) during driving and improving ground contact characteristics.

Note that while it is preferred that peak T1 of first mounded region M1 in which angle varies be located at a central portion in the tire width direction of shoulder rib region A1, it will be possible to obtain the foregoing benefit whereby ground contact characteristics are improved so long as peak T1 is located within shoulder rib region A1.

Furthermore, a second mounded region M2 in which angle varies (corresponding to a mounded region in which angle varies and which is toward the center) that has a peak T2 at which angle of inclination is greater than at the periphery, and that corresponds to mediate rib 33 which is one of the plurality of ribs 32, 33, 34 other than shoulder rib 32, is provided. Mediate rib 33 is arranged toward the center (inward) in the tire width direction from shoulder rib 32. Peak T2 of second mounded region M2 in which angle varies is arranged at region A2 which appears to overlap the corresponding mediate rib 33 as seen in plan view. Similarly, a third mounded region M3 in which angle varies (corresponding to a mounded region in which angle varies and which is toward the center) that has a peak T3 at which angle $\theta$ of inclination is greater than at the periphery, and which corresponds to center rib 34 that is one of the plurality of ribs 32, 33, 34 other than shoulder rib 32, is provided. Center rib 34 is arranged toward the center (inward) in the tire width direction from mediate rib 33. Peak T3 of third mounded region M3 in which angle varies is arranged at region A3 which appears to overlap the corresponding center rib 34 as seen in plan view. By thus causing mounded regions in which angle varies to be provided in correspondence to respective ribs, there is a relatively increased tendency for contact with the ground to occur, and there is an increase in contact patch pressure, toward the centers of the respective ribs, and there is a relatively decreased tendency for contact with the ground to occur, and there is a decrease in contact patch pressure, toward the ends of the respective ribs.

While it is sufficient that peak T2 of second mounded region M2 in which angle varies, and peak T3 of third mounded region M3 in which angle varies, be arranged at regions A2 and A3 which appear to overlap the corresponding ribs as seen in plan view, it is preferred that these be located at central locations in the tire width direction of the corresponding ribs.

Figure 3:
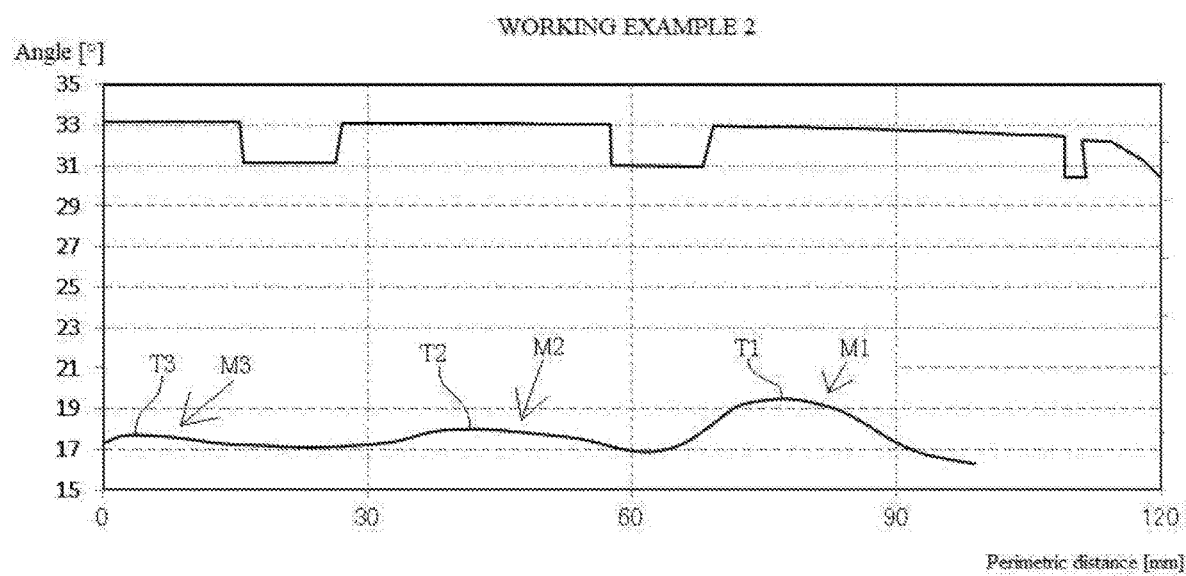
FIG. 3 Drawing showing relationship between cord angle at third belt and profile at tread in Working Example 2.

Whereas angles $\theta$ of inclination at peak T1 of first mounded region M1 in which angle varies, peak T2 of second mounded region M2 in which angle varies, and peak T3 of third mounded region M3 in which angle varies are the FIG. 2, are identical, it is preferred as shown in FIG. 3 that these increase in magnitude as one proceeds from a location toward the tire equator to a location toward the exterior in the tire width direction. By so doing, it will be the case that—focusing on the locations corresponding to peaks T1, T2, and T3—ground contact characteristics at these respective locations are increasingly improved as one proceeds from a location toward the tire equator to a location toward the exterior in the tire width direction.

Figure 4:
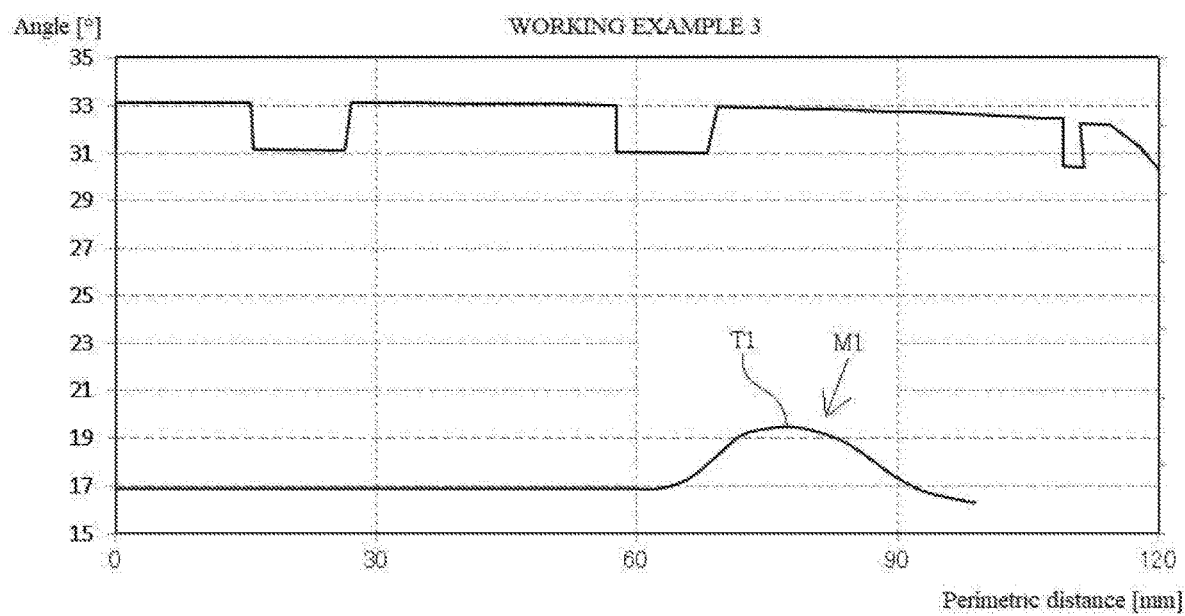
FIG. 4 Drawing showing relationship between cord angle at third belt and profile at tread in Working Example 3.

Note that while a second mounded region M2 in which angle varies and a third mounded region M3 in which angle varies are present at FIG. 2 and FIG. 3, it is also possible for there to be no second mounded region M2 in which angle varies or third mounded region M3 in which angle varies but only a first mounded region M1 in which angle varies as shown in FIG. 4.

Angle of inclination of the cords at second and third belt plies 82, 83 is 15° to 25°, and is preferably 15° to 20°. It is preferred that angle vary smoothly within these ranges of angles. This is because any bending will cause strain to be concentrated thereat. If the angle is too large, weakening of the constraining force of the belt will cause the radial increase in dimensions during driving to become large, as a result of which there will be occurrence of the problem whereby there is uneven wear due to distorted contact patch shape and nonuniform contact patch pressure. If the angle is too small the constraining force of the belt will be large, and deformation of the tread during contact with the ground will be felt by only the tread region, which will lead to an increase in the tendency for uneven wear to occur.

As described above, a pneumatic tire in accordance with the present embodiment having a carcass 4, and having four belt plies 81, 82, 83, 84 laminated at an outside circumference of the carcass 4 in a tread region 3, wherein formed at a surface of the tread region 3 are a plurality of major grooves 31 which extend in a tire circumferential direction CD, and a plurality of ribs 32, 33, 34 which extend in continuous fashion in the tire circumferential direction CD and which are partitioned by the major grooves 31. Cords C2, C3 at second and third belt plies 82, 83 among the four belt plies 81, 82, 83, 84, as numbered from the carcass 4 to the outside circumference, intersect, being inclined in mutually opposite fashion with respect to a tire axis. Angles of inclination with respect to the tire circumferential direction CD of the second and third belt plies 82, 83 are such that an angle θ2 at a belt end 82a, 83a is less than an angle θ1 at a tire equator CL. A first mounded region M1 in which angle varies that has a peak T1 at which the angle θ of inclination is greater than at a periphery and that corresponds to a shoulder rib 32 which among the plurality of ribs 32, 33, 34 is outwardmost in a tire width direction WD is provided. The peak T1 at the first mounded region M1 in which angle varies is arranged at a shoulder rib region A1 which appears to overlap the shoulder rib 32 as seen in plan view.

Thus, because second and third belt plies 82, 83 are main belts that intersect, being inclined in mutually opposite fashion with respect to the axis of the tire, and because the angles of inclination of main belts 82, 83 are such that the angle at belt ends 82a, 83a is less than the angle at the tire equator CL, the degree to which constraining by main belts 82, 83 occurs will be greater in the shoulder region than at the tire equator CL, permitting suppression of increase in dimensions in the radial direction at the shoulder region during driving.

On the other hand, when one looks at the overall contact patch, there is a tendency for contact patch pressure to be high at the tire equator and for contact patch pressure to be low and to decrease farther as one proceeds toward the shoulder region which is toward the exterior in the tire width direction. Locations at which contact patch pressure is relatively low are more likely than locations at which contact patch pressure is relatively high to exhibit slipping, which tends to lead to occurrence of uneven wear. Causing first mounded region M1 in which angle varies and which has a peak T1 at which angle θ of inclination is greater than at the periphery to be provided in correspondence to shoulder rib(s) 32 therefore results in presence of portion(s) at which angle θ of inclination is relatively large at shoulder rib(s) 32, making it possible to tolerate increase in dimensions in the radial direction at shoulder rib(s) 32 during driving and improving ground contact characteristics, reducing nonuniformity in contact patch pressure at the tire equator and shoulder region(s), and making it possible to improve resistance to uneven wear.

On the other hand, when one looks only at the ribs, because when a rib comes in contact with the road surface and the rib is compressed, the rib ends, rather than the central portion of the rib tread, are such that, the constraining force being small, these will be deformed toward the exterior of the rib ends, it is believed that the situation that exists when contact patch pressure is highest at the rib center and when contact patch pressure decreases as one proceeds toward the rib ends is an ideal contact patch pressure distribution. Because when peak T1 of first mounded region M1 in which angle varies to be arranged at shoulder rib region A1 which appears to overlap shoulder rib 32 as seen in plan view it will therefore be the case that the larger the angle of inclination the greater will be the tendency to come in contact with the ground, contact patch pressure will be high toward the center of the shoulder rib, and this will be adjusted in a direction such as will cause contact patch pressure to decrease toward the shoulder rib ends, and ground contact characteristics of the shoulder rib when viewed by itself will be improved, making it possible to improve resistance to uneven wear.

It will therefore be possible to improve resistance to uneven wear and to suppress increase in radial dimensions at shoulder regions during driving.

At the example of FIG. 4, in the region toward the center in the tire width direction from first mounded region M in which angle varies, there is no such mounded region in which angle varies that has a peak at which the angle of inclination is greater than at the periphery. As a result of adoption of such a constitution, it will be possible to improve resistance to uneven wear and to suppress increase in radial dimensions at shoulder regions during driving.

In accordance with the present embodiment, a mounded region in which angle varies that is toward a center (second mounded region M2 in which angle varies and third mounded region M3 in which angle varies) and that has a peak T2, T3 at which the angle θ of inclination is greater than at a periphery and that corresponds to a rib 33, 34 which among the plurality of ribs 32, 33, 34 is not the shoulder rib 32, is provided. A peak T2, T3 at the mounded region in which angle varies that is toward the center (second mounded region M2 in which angle varies and third mounded region M3 in which angle varies) is arranged at a region A2. A3 which appears to overlap the corresponding rib 33, 34 as seen in plan view.

In accordance with such constitution, not only at shoulder rib 32 but also at the other ribs 33, 34 as well, because second mounded region M2 in which angle varies and third mounded region M3 in which angle varies are provided, and because peaks T2 and T3 of second mounded region M2 in which angle varies and third mounded region M3 in which angle varies are arranged at regions A2 and A3 which appear to overlap the corresponding ribs 33 and 34 as seen in plan view, contact patch pressure will be high toward the centers of the respective ribs, and this will be adjusted in a direction such as will cause contact patch pressure to decrease toward the rib ends, and ground contact characteristics of the respective ribs when viewed by themselves will be improved, making it possible to improve resistance to uneven wear.

In accordance with the present embodiment, the angles θ of inclination of the peaks T1, T2, T3 at the first mounded region M1 in which angle varies and the mounded region in which angle varies (second mounded region M2 in which angle varies and third mounded region M3 in which angle varies) that is toward the center increase in magnitude as one proceeds from a location toward the tire equator to a location toward an exterior in the tire width direction.

As a result of adoption of such constitution, as one proceeds from a location toward the tire equator to a location toward the exterior in the tire width direction, there is increased ability to tolerate increase in dimensions in the radial direction at peaks T1, T2, and T3 during driving and increased improvement in ground contact characteristics; and nonuniformity in contact patch pressure over a region extending from a location toward the tire equator to the shoulder region at a location toward the exterior in the tire width direction is made small, making it possible to improve resistance to uneven wear.

At the example of FIGS. 2 and 3, among the plurality of ribs, there is a mediate rib 33 that is arranged toward a center in the tire width direction WD from the shoulder rib 32, and there is a center rib 34 that is arranged toward the center in the tire width direction WD from the mediate rib 33. The mounded region in which angle varies that is toward the center has a second mounded region M2 in which angle varies that is arranged at a region A2 which appears to overlap the mediate rib 33 as seen in plan view, and has a third mounded region M3 in which angle varies that is arranged at a region A3 which appears to overlap the center rib 34 as seen in plan view.

At the example of FIG. 2, the angle of inclination at the peak T1 of the first mounded region M1 in which angle varies, the angle of inclination at the peak T2 of the second mounded region M2 in which angle varies, and the angle of inclination at the peak T3 of the third mounded region M3 in which angle varies are identical.

At the example of FIG. 3, the angle of inclination at the peak T1 of the first mounded region M1 in which angle varies is greater than the angle of inclination at the peak T2 of the second mounded region M2 in which angle varies, and the angle of inclination at the peak T2 of the second mounded region M2 in which angle varies is greater than the angle of inclination at the peak T3 of the third mounded region M3 in which angle varies.

In accordance with the present embodiment, the angle $\theta$ of inclination of the cords C2, C3 at the second and third belt plies 82, 83 is 15° to 25°.

Adoption of such constitution is preferred in that it will permit improvement in resistance to uneven wear and suppress increase in radial dimensions at shoulder regions during driving.

WORKING EXAMPLES

To illustrate the constitution and effect of the present disclosure in specific terms, evaluation was carried out as follows with respect to the following working examples.

(1) Radial Increase in Dimensions During Driving

Under conditions such that tire size was 295/75R22.5, rim size was 22.5×8.25, and air pressure was 760 kPa, inside diameter was measured for three situations—these being the tire as mounted on its rim but before being fully inflated, the tire as fully inflated but before being placed in service, and the tire as fully inflated following increase in dimensions during driving—and the amount of change in the inner surface between the tire as mounted on its rim but before being fully inflated and the tire as fully inflated following increase in dimensions during driving was expressed in terms of an index. Results are shown as indexed relative to a value of 100 for Comparative Example 1, the smaller the index the less the increase in radial dimensions during driving, and thus the better the result. Note that "the tire as mounted on its rim but before being fully inflated" refers to a situation in which a brand new tire is mounted on a rim and is inflated slightly to an internal pressure of 50 kPa. Furthermore, "the tire as fully inflated but before being placed in service" refers to a situation in which further inflation is carried out with respect to "the tire as mounted on its rim but before being fully inflated" so as to cause this to have an internal pressure of 760 kPa. Furthermore, "the tire as fully inflated following increase in dimensions during driving" refers to a situation in which "the tire as fully inflated but before being placed in service" was mounted on a drum and driven for 300 km at 88 km/h, and was thereafter made to have an internal pressure of 760 kPa.

(2) Resistance to Uneven Wear

A tire having a tire size of 295/75R22.5 was mounted on a wheel of rim size 22.5×8.25 with an air pressure of 760 kPa (internal pressure as specified by TRA), and testing was carried out by causing this to be run under conditions such that speed was 80 km/h and load was 2800 kg (TRA 100% load), and the ratio of the amount of wear at the center (Ce) versus the shoulder rib (Sh) was displayed. When Sh>Ce, Sh/Ce has a positive value to indicate that there was greater wear at the shoulder, when Ce>Sh, Ce/Sh has a negative value to indicate that there was greater wear at the center, and when Sh=Ce, this is 1.0 and indicates that wear was uniform. 1.0 is preferred.

Working Example 1

Angle of inclination of cords C3 at third belt ply 83 was made to be as shown in FIG. 2. Second belt ply 82 was flipped relative to third belt ply 83. This was made to be such that angle $\theta 1$ of inclination at tire equator CL>angle $\theta 2$ of inclination at belt end 83a. This was made to be such that $\theta 1=19.5°$ and $\theta 2=16.3°$. A first mounded region M1 in which angle varied and which corresponded to shoulder rib 32 was provided; a second mounded region M2 in which angle varied and which corresponded to mediate rib 33 was provided; and a third mounded region M3 in which angle varied and which corresponded to center rib 34 was provided. Angles $\theta$ of inclination at peaks T1, T2, and T3 at the respective mounded regions M1, M2, and M3 in which angle varied were all the same, being 19.5°.

Working Example 2

Angle of inclination of cords C3 at third belt ply 83 was made to be as shown in FIG. 3. This was made to be such that angle $\theta 1$ of inclination at tire equator CL>angle $\theta 2$ of inclination at belt end 83a, this being made such that $\theta 1=17.3°$ and $\theta 2=16.3°$. Angles $\theta$ of inclination at peaks T1, T2, and T3 of first mounded region M1 in which angle varied, second mounded region M2 in which angle varied, and third mounded region M3 in which angle varied increased in magnitude as one proceeds from a location toward the tire equator to a location toward the exterior in the tire width direction. Angle $\theta$ of inclination at peak T3 of third mounded region M3 in which angle varied was 17.7°, angle $\theta$ of inclination at peak T2 of second mounded region M2 in which angle varied was 18°, and angle $\theta$ of inclination at peak T1 of first mounded region M1 in which angle varied was 19.5°. In other respects, it was similar to Working Example 1.

Working Example 3

Angle of inclination of cords C3 at third belt ply 83 was made to be as shown in FIG. 4. This was made to be such that angle θ1 of inclination at tire equator CL>angle θ2 of inclination at belt end 83a, this being made such that θ1=16.9° and θ2=16.3°. Only first mounded region M1 in which angle varied was provided, no second mounded region M2 in which angle varied or third mounded region M3 in which angle varied having been provided. That is, no mounded region in which angle varied was present toward the center (inward) in the tire width direction from first mounded region M1 in which angle varied. Angle θ of inclination at peak T1 of first mounded region M1 in which angle varied was 19.5°. In other respects, it was similar to Working Example 1.

Comparative Example 1

Figure 5:
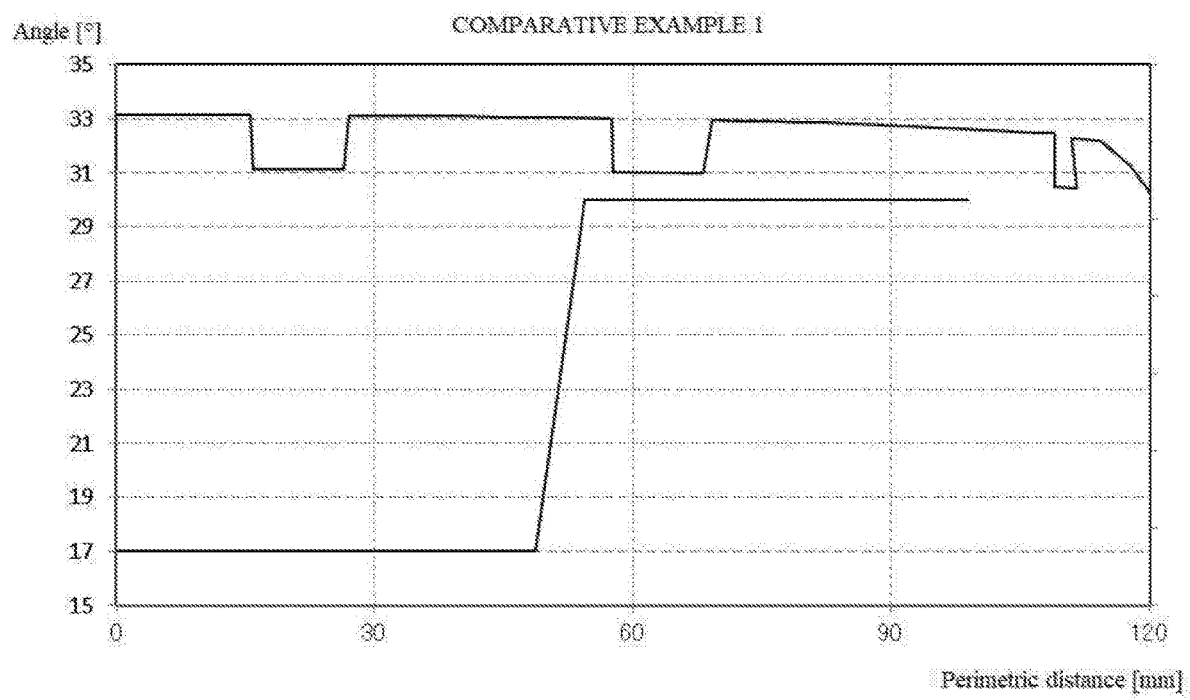
FIG. 5 Drawing showing relationship between cord angle at third belt and profile at tread in Comparative Example 1.

Angle of inclination of cords C3 at third belt ply 83 was made to be as shown in FIG. 5. Second belt ply 82 was flipped relative to third belt ply 83. This was made to be such that angle θ1 of inclination at tire equator CL<angle θ2 of inclination at belt end 83a.

Comparative Example 2

Figure 6:
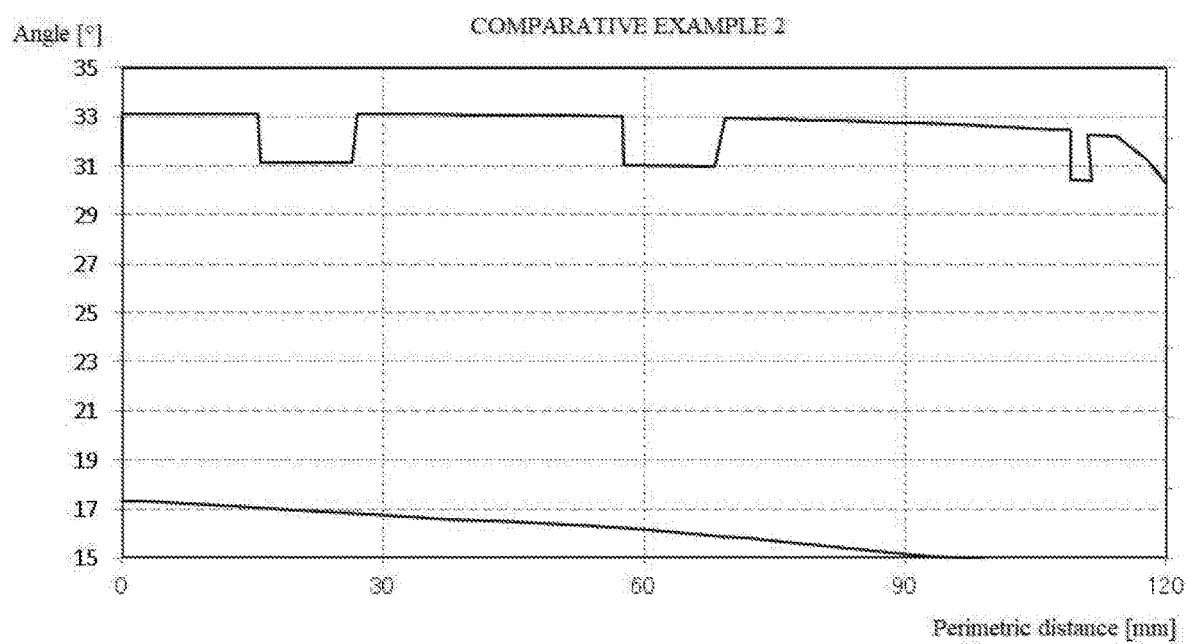
FIG. 6 Drawing showing relationship between cord angle at third belt and profile at tread in Comparative Example 2.

Angle of inclination of cords C3 at third belt ply 83 was made to be as shown in FIG. 6. Second belt ply 82 was flipped relative to third belt ply 83. This was made to be such that angle θ1 of inclination at tire equator CL>angle θ2 of inclination at belt end 83a.

TABLE 1

|  | Comparative Example 1 | Comparative Example 2 | Working Example 1 | Working Example 2 | Working Example 3 |
|---|---|---|---|---|---|
| Cord angle | FIG. 5 | FIG. 6 | FIG. 2 | FIG. 3 | FIG. 4 |
| Radial increase in dimensions during driving | 100 | 95 | 95 | 95 | 95 |
| Resistance to uneven wear | 1.8 | 1.5 | 1.1 | 1.0 | 1.0 |

From TABLE 1, with respect to radial increase in dimensions during driving, this was smaller at Comparative Example 2 than at Comparative Example 1. This is thought to be due to the fact that because angles of inclination of cords at second and third belt plies 82, 83 were such that the angle at the belt ends was less than the angle at the tire equator CL, increase in dimensions in the radial direction during driving was constrained at belt ends, i.e., at the shoulder regions.

With regard to both radial increase in dimensions during driving and resistance to uneven wear, Working Examples 1, 2, and 3 were improved as compared with Comparative Example 1. Because the angle at the belt ends was less than the angle at the tire equator CL, radial increase in dimensions during driving was suppressed. It is furthermore thought that causing a first mounded region M1 in which angle varied to be provided thereat resulted in improvement in resistance to uneven wear.

It is thought that the reason that resistance to uneven wear was worse at Working Example 1 than at Working Example 2 was due to the fact that, notwithstanding the tendency for contact patch pressure to be lower at shoulder portions than at the tire equator CL, angles at peaks T1, T2, and T3 at mounded regions M1, M2, and M3 in which angle varied were all made the same. It is therefore clear that causing angle(s) of inclination at peak(s) to increase as one proceeds from a location toward the tire equator to a location toward the belt end (outward in the tire width direction) is effective.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A pneumatic tire having a carcass, and having four belt plies laminated at an outside circumference of the carcass in a tread region, wherein formed at a surface of the tread region are a plurality of major grooves which extend in a tire circumferential direction, and a plurality of ribs which extend in continuous fashion in the tire circumferential direction and which are partitioned by the major grooves;
    wherein cords at second and third belt plies among the four belt plies, as numbered from the carcass to the outside circumference, intersect, being inclined in mutually opposite fashion with respect to a tire axis;
    wherein angles of inclination with respect to the tire circumferential direction of the second and third belt plies are such that an angle at a belt end is less than an angle at a tire equator;
    wherein a first mounded region in which angle varies that has a peak at which the angle of inclination is greater than at a periphery and that corresponds to a shoulder rib which among the plurality of ribs is outwardmost in a tire width direction is provided; and
    wherein the peak at the first mounded region in which angle varies is arranged at a shoulder rib region which appears to overlap the shoulder rib as seen in plan view.

2. The pneumatic tire according to claim 1, wherein, in a region toward a center in the tire width direction from the first mounded region in which angle varies, there is no mounded region in which angle varies that has a peak at which the angle of inclination is greater than at a periphery.

3. The pneumatic tire according to claim 1, wherein the angle of inclination of the cords at the second and third belt plies is 15° to 25°.

4. The pneumatic tire according to claim 1,
    wherein a mounded region in which angle varies that is toward a center and that has a peak at which the angle of inclination is greater than at a periphery and that corresponds to a rib which among the plurality of ribs is not the shoulder rib is provided; and
    wherein a peak at the mounded region in which angle varies that is toward the center is arranged at a region which appears to overlap the corresponding rib as seen in plan view.

5. The pneumatic tire according to claim 4, wherein the angles of inclination of the peaks at the first mounded region in which angle varies and the mounded region in which angle varies that is toward the center increase in magnitude as one proceeds from a location toward the tire equator to a location toward an exterior in the tire width direction.

6. The pneumatic tire according to claim 4,
wherein, among the plurality of ribs, there is a mediate rib that is arranged toward a center in the tire width direction from the shoulder rib, and there is a center rib that is arranged toward the center in the tire width direction from the mediate rib;
wherein the mounded region in which angle varies that is toward the center has a second mounded region in which angle varies that is arranged at a region which appears to overlap the mediate rib as seen in plan view, and has a third mounded region in which angle varies that is arranged at a region which appears to overlap the center rib as seen in plan view.

7. The pneumatic tire according to claim 6, wherein the angle of inclination at the peak of the first mounded region in which angle varies, the angle of inclination at the peak of the second mounded region in which angle varies, and the angle of inclination at the peak of the third mounded region in which angle varies are identical.

8. The pneumatic tire according to claim 6, wherein the angle of inclination at the peak of the first mounded region in which angle varies is greater than the angle of inclination at the peak of the second mounded region in which angle varies, and the angle of inclination at the peak of the second mounded region in which angle varies is greater than the angle of inclination at the peak of the third mounded region in which angle varies.

* * * * *